United States Patent
Adamczyk et al.

(10) Patent No.: US 10,530,160 B2
(45) Date of Patent: Jan. 7, 2020

(54) POWER TRANSMISSION NETWORK

(71) Applicant: General Electric Technology GmbH, Baden (CH)

(72) Inventors: Andrzej Grzegorz Adamczyk, Stafford (GB); Carl David Barker, Walton Stone (GB); Robert Stephen Whitehouse, Stafford (GB)

(73) Assignee: General Electric Technology GmbH, Baden (CH)

( * ) Notice: Subject to any disclaimer, the term of this patent is extended or adjusted under 35 U.S.C. 154(b) by 97 days.

(21) Appl. No.: 15/559,660

(22) PCT Filed: Mar. 17, 2016

(86) PCT No.: PCT/EP2016/055808
§ 371 (c)(1),
(2) Date: Sep. 19, 2017

(87) PCT Pub. No.: WO2016/146746
PCT Pub. Date: Sep. 22, 2016

(65) Prior Publication Data
US 2019/0123562 A1    Apr. 25, 2019

(30) Foreign Application Priority Data
Mar. 19, 2015  (EP) .................................... 15275078

(51) Int. Cl.
*H02J 3/36*  (2006.01)
*H02J 3/38*  (2006.01)
(Continued)

(52) U.S. Cl.
CPC ............... *H02J 3/36* (2013.01); *H02J 3/386* (2013.01); *H02M 7/7575* (2013.01); *H02M 7/17* (2013.01);
(Continued)

(58) Field of Classification Search
None
See application file for complete search history.

(56) References Cited

U.S. PATENT DOCUMENTS

2002/0008982 A1  1/2002  Jiang-Hafner
2013/0128630 A1  5/2013  Jensen et al.

FOREIGN PATENT DOCUMENTS

CN  103457287 A  12/2013

OTHER PUBLICATIONS

Adam, G.P., and Ahmed, K.H., "AC Fault Ride-Through Capability of a VSC-HVDC Transmission Systems," Energy Conversion Congress and Exposition, pp. 3739-3745 (Sep. 12-16, 2010).
(Continued)

*Primary Examiner* — Thienvu V Tran
*Assistant Examiner* — David M Stables
(74) *Attorney, Agent, or Firm* — Eversheds Sutherland (US) LLP (57) ABSTRACT

A power transmission network, for interconnecting a variable power source and a AC electrical network including: a DC transmission link for power transmission between a network side converter and a source side converter; a AC transmission link for power transmission from the respective variable power source to a source side converter; a source side converter including: a DC connecting point operably connected to the respective transmission link; and an AC connecting point operably connected to the respective transmission link; a network side converter including: an AC connecting point for connection to the respective electrical network; and a DC connecting point operably connected to the respective transmission link; and a control system, where a network side converter is designated as a first converter,
(Continued)

and the control system is configured to operate each first converter as a DC slack bus to vary a DC voltage at its DC connecting point.

17 Claims, 5 Drawing Sheets

(51) Int. Cl.
    *H02M 7/757*     (2006.01)
    *H02M 7/17*     (2006.01)
    *H02M 7/493*     (2007.01)

(52) U.S. Cl.
    CPC ............ *H02M 7/493* (2013.01); *Y02E 10/763* (2013.01); *Y02E 60/60* (2013.01)

(56) References Cited

OTHER PUBLICATIONS

Shen, L., et al., "Control of VSC HVDC System Integrated with AC Network," 10th IET International Conference on AC and DC Power Transmission, pp. 1-2 (2012) (Abstract).

Xu, L., et al., "Grid Integration of Large DFIG-Based Wind Farms Using VSC Transmission," IEEE Transactions on Power Systems, vol. 22, Issue 3, pp. 976-984 (2007) (Abstract).

Extended European Search Report and Opinion issued in connection with corresponding EP Application No. 15275078.2 dated Oct. 22, 2015.

International Search Report and Written Opinion issued in connection with corresponding PCT Application No. PCT/EP2016/055808 dated Jun. 9, 2016.

POWER TRANSMISSION NETWORK

FIELD OF INVENTION

This invention relates to a power transmission network for interconnecting at least one variable power source and at least one AC or DC electrical network and, in particular, a high voltage power transmission network.

BACKGROUND OF THE INVENTION

The connection of a variable power source to a power grid can lead to the introduction of unwanted power changes resulting from the variability in generated power. Such variability in generated power may arise due to the intermittent nature of renewable energy resources, such as wind, tidal and solar farms. These power changes may lead to grid instability and thereby affect the quality of the transmitted power in the power grid, which has economic implications for the power supplier and the end user.

According to a first aspect of the invention, there is provided a power transmission network, for interconnecting at least one variable power source and at least one AC or DC electrical network, comprising: at least one DC transmission link for DC power transmission between at least one network side converter and at least one source side converter; at least one AC transmission link for AC power transmission from the or each respective variable power source to at least one source side converter; at least one source side converter including: a DC connecting point operably connected to the or each respective DC transmission link; and an AC connecting point operably connected to the or each respective AC transmission link; at least one network side converter including: an AC or DC connecting point for connection to the or each respective AC or DC electrical network; and a DC connecting point operably connected to the or each respective DC transmission link; and a control system, wherein at least one network side converter is designated as a first converter, and the control system is configured to operate the or each first converter in a DC voltage control mode as a DC slack bus to vary a DC voltage at its DC connecting point with respect to the power generated by the or each respective variable power source.

A variable power source may be any power source, such as an intermittent energy source, that is capable of generating a variable power. Examples of an intermittent energy source include, but are not limited to, a wind farm, a tidal farm and a solar farm.

The or each AC electrical network may be or may include an AC power grid or system. The or each DC electrical network may be or may include a DC power grid or system.

During operation of the power transmission network, a variation in power generated by one or more connected variable power sources may arise. This may be due to, for example, the intermittent nature of renewable energy resources such as wind, tidal and solar farms.

For economic reasons, instead of controlling the amount of power generated by the or each variable power source, the power transmission network is configured to accommodate the variation in power generated by the or each variable power source, thereby transmitting all of the power generated by the or each variable power source to the or each AC electrical network.

For example, at least one source side converter may be designated as a second converter, and the control system may be configured to operate the or each second converter in an AC voltage control mode as an AC slack bus to control a magnitude and/or frequency of an AC voltage of the or each respective AC transmission link at a steady-state value and thereby facilitate variation of a power transfer between its AC and DC connecting points to accommodate a variation in power generated by the or each respective variable power source. Operation of the or each second converter in the AC voltage control mode facilitates generation of a stable AC voltage waveform in the or each respective AC transmission link and thereby allows the or each variable power source to synchronize to the or each respective stable AC voltage waveform. Such synchronization ensures that any power generated by the or each variable power source will be accommodated by the or each source side converter and thereby injected into the power transmission network for transmission to the or each AC electrical network.

Operation of the or each second converter in the AC voltage control mode however means that the DC voltage at the DC connecting point of the or each second converter is uncontrolled if all of the degrees of freedom available to the or each second converter is used to operate the or each second converter in the AC voltage control mode. Such circumstances require control of the DC voltage at the DC connecting point of the or each respective network side converter in order to enable operation of the power transmission network.

The inclusion of the control system in the power transmission network according to embodiments of the invention enables control of the DC voltage at the DC connecting point of at least one network side converter by designating at least one network side converter as a first converter and operating the or each first converter in the DC voltage control mode as a DC slack bus to vary a DC voltage at its DC connecting point with respect to the power generated by the variable power source. This permits optimization of power transmission in the DC transmission link, such as reducing transmission losses in the DC transmission.

It will be understood that variation of the DC voltage at the DC connecting point may be a direct result of control of the DC voltage at the DC connecting point or be an indirect result of control of another DC voltage at another point in the power transmission network.

The transmission of power from the or each variable power source to the or each AC electrical network requires a voltage slope across the or each respective DC transmission link to cause transfer of power from the or each source side converter to the or each respective network side converter. In other words, to transmit power from the or each variable power source to the or each AC electrical network, the DC voltage at the DC connecting point of the or each source side converter must be higher than the or each respective network side converter. A high power transfer from the or each source side converter to the or each respective network side converter requires a high voltage slope across the or each respective DC transmission link, while a low power transfer from the or each source side converter to the or each respective network side converter requires a low voltage slope across the or each respective DC transmission link.

Transmission losses during transmission of power via the or each DC transmission link may be reduced by increasing an average DC voltage of the or each DC transmission link to be near or at its maximum allowable level, which may be dictated by the voltage rating at the DC connecting point of each converter operably connected to the DC transmission link or the voltage rating of any other equipment connected to the DC transmission link. A reduction in transmission losses is achieved by operating the or each respective first converter in the DC voltage control mode to increase the DC voltage at its DC connecting point and thereby increase the average DC voltage of the or each DC transmission link to be near or at its maximum allowable level when the DC voltage at the DC connecting point of at least one second converter is uncontrolled.

However, the variability in power generated by the or each variable power source, together with the requirement for a voltage slope across the or each DC transmission link, may result in an increase in DC voltage at the DC connecting point of at least one converter above a safe level (e.g. a voltage rating at the DC connecting point) that results in unsafe operation of the power transmission network.

As mentioned above, the inclusion of the control system in the power transmission network according to embodiments of the invention enables operation of the or each first converter in the DC voltage control mode to vary the DC voltage at its DC connecting point with respect to the power generated by the variable power source. Such operation of the or each first converter in the DC voltage control mode not only enables control of the DC voltage at the DC connecting point of each converter to stay below or at a safe level across the range of variation of power generated by the or each variable power source, but also enables the increase of the average DC voltage of the or each respective DC transmission link during a decrease in power generated by the or each variable power source to reduce a DC current flowing in the or each respective DC transmission link so as to reduce transmission losses for a given power generated by the or each variable power source, thus optimizing power transmission in the power transmission network. It follows that, in order to keep transmission losses at a minimum value, the DC voltage at the DC connecting point may be continuously varied to be kept at a maximum value for a given power generated by the or each respective variable power source.

Hence, the ability of the or each first converter to operate in the DC voltage control mode allows optimization of the operation of the power transmission network according to embodiments of the invention, and therefore results in a more efficient, reliable and cost-effective power transmission network.

In contrast, omission of the control system from the power transmission network according to embodiments of the invention removes the ability of the or each first converter to operate in the DC voltage control mode as a DC slack bus to vary a DC voltage at its DC connecting point with respect to the power generated by the or each respective variable power source. Consequently, in order to ensure safe operation of the power transmission network and maintain the required voltage slope across the or each DC transmission link, the DC voltage at the DC connecting point of the or each network side converter must be at all times fixed at a value that corresponds to the maximum level of power generated by the or each variable power source. This however results in sub-optimal operation of the power transmission network because, whenever the power generated by the or each variable power source falls below its maximum level, the power transmission network is incapable of increasing the fixed DC voltage at the DC connecting point of the or each network side converter to reduce transmission losses.

The control system may be configured to operate the or each first converter to maintain a DC voltage of the or each respective DC transmission link at a DC voltage limit when varying the DC voltage at its DC connecting point. The DC voltage limit may be defined by a voltage rating of the DC transmission link or by a value that is lower than the voltage rating of the DC transmission link by a predefined voltage safety margin.

In embodiments of the invention the control system may be configured to operate the or each first converter to maintain a DC voltage at the DC connecting point of the or each source side converter at a DC voltage limit when the or each first converter is operated in the DC voltage control mode. The DC voltage limit may be defined by a voltage rating of the DC connecting point of the second converter or by a value that is lower than the voltage rating of the DC connecting point of the second converter by a predefined voltage safety margin.

Whilst the predefined voltage safety margin limits the extent to which the transmission losses in the power transmission network can be reduced through use of embodiments of the invention, configuring the control system in this manner not only further enhances the reliability of the power transmission network, but allows an operator to readily ensure the operation of the or each first converter in the DC voltage control mode complies with specific safety parameters through modification of the predefined voltage safety margin.

Operation of the or each first converter in the DC voltage control mode as a DC slack bus to vary a DC voltage at its DC connecting point with respect to the power generated by the or each respective variable power source may be carried out in different ways. For example, the control system may be configured to receive: at least one power or direct current measurement of the power transmission network and to operate the or each first converter in the DC voltage control mode in accordance with the or each power or direct current measurement; and/or a predicted or dispatched power generation value from the or each variable power source and to operate the or each first converter in the DC voltage control mode in accordance with the predicted or dispatched power generation value or with a value that varies from the predicted or dispatched power generation value by a predefined power safety margin.

It will be appreciated that the or each power measurement can be derived from other measurements. For example, the or each power measurement can be a product of voltage and current measurements.

The or each power or direct current measurement of the power transmission network may be measured at any point of the power transmission network, such as a point of connection to the or each variable power source or the AC or DC connecting point of a source or network side converter.

The use of the power safety margin in the operation of the or each first converter in the DC voltage control mode minimizes any adverse effect of any error in the predicted or dispatched power generation value might have on the DC voltage at the DC connecting point of the or each first converter.

In further embodiments of the invention the control system may be configured to operate the or each first converter to maintain the DC voltage at its respective DC connecting point to be continuously lower than the DC voltage at the DC connecting point of the or each respective source side converter when power is being transmitted from the or each variable power source to the or each AC electrical network. Configuration of the control system in this manner ensures complete evacuation of the power generated by the or each variable power source into the power transmission network.

The control system may be configured to operate the or each first converter to vary an AC voltage magnitude or a reactive power at its AC connecting point when the or each first converter is operated in the DC voltage control mode.

The availability of an additional degree of freedom to the or each first converter permits its operation to vary an AC voltage magnitude or a reactive power at its AC connecting point while being operated in the DC voltage control mode, thus adding to the functionality of the or each first converter and thereby further improving the efficiency of the power transmission network.

In still further embodiments of the invention the control system may be configured to receive at least one DC voltage measurement of the power transmission network and to operate the or each first converter in a DC voltage correction mode to vary a DC voltage at its DC connecting point so that the or each DC voltage measurement of the power transmission network match a predefined DC voltage profile. This allows the or each first converter to be operated to vary the DC voltage at its DC connecting point in the event that the or each DC voltage measurement does not match the predefined DC voltage profile.

The or each DC voltage measurement of the power transmission network may be measured at any DC point of the power transmission network, such as any point along a DC transmission link or a DC connecting point of a source or network side converter.

The configuration of the control system may vary depending on specific requirements of the power transmission network. For example, the control system may include a global controller for controlling a plurality of converters, at least one local controller for controlling at least one converter, or a combination thereof. The global controller may be located remotely from each converter and may be configured to communicate with each converter via telecommunications links. The or each local controller may be located in the vicinity of at least one converter. The global controller may be configured to communicate with at least one local controller via telecommunications links.

The power transmission network may be configured in various ways depending on its purpose.

The power transmission network according to embodiments of the invention may be configured for interconnecting a variable power source and an AC electrical network. More particularly, in embodiments of the invention, the power transmission network may include: a DC transmission link for DC power transmission between a network side converter and a source side converter; an AC transmission link for AC power transmission from the variable power source to a source side converter; a source side converter including: a DC connecting point operably connected to the DC transmission link; and an AC connecting point operably connected to the AC transmission link; and a network side converter including: an AC connecting point for connection to the AC electrical network; and a DC connecting point operably connected to the DC transmission link.

In this manner the power transmission network according to embodiments of the invention is configured as a point-to-point power transmission network.

In such embodiments of the invention the source side converter may be designated as a second converter, and the control system may be configured to operate the second converter in an AC voltage control mode as an AC slack bus to control a magnitude and frequency of an AC voltage of the AC transmission link at a steady-state value and thereby facilitate variation of a power transfer between its AC and DC connecting points to accommodate a variation in power generated by the variable power source.

The power transmission network according to embodiments of the invention may be configured for interconnecting at least one variable power source and at least one AC electrical network. More particularly, in other embodiments of the invention, the power transmission network may include: a DC transmission link for DC power transmission between at least one network side converter and at least one source side converter; first and second DC terminals, the DC transmission link being configured to operably interconnect the first and second DC terminals; at least one AC transmission link for AC power transmission from the or each respective variable power source to a or each respective source side converter; at least one source side converter including: a DC connecting point operably connected to the first DC terminal; and an AC connecting point operably connected to the or each respective AC transmission link; and at least one network side converter including: an AC connecting point for connection to the or each respective AC electrical network; and a DC connecting point operably connected to the second DC terminal.

In this manner the power transmission network according to embodiments of the invention is configured as a multi-terminal power transmission network.

In such embodiments of the invention the or each source side converter may be designated as a second converter, and the control system may be configured to operate the or each second converter in an AC voltage control mode as an AC slack bus to control a magnitude and frequency of an AC voltage of the or each respective AC transmission link at a steady-state value and thereby facilitate variation of a power transfer between its AC and DC connecting points to accommodate a variation in power generated by the or each respective variable power source.

In embodiments of the invention including a plurality of network side converters, at least one network side converter not designated as a first converter may be designated as a third converter, and the control system may be configured to operate the or each third converter in a DC power control mode to control a DC power at its DC connecting point. This permits the operation of the power transmission network to maximize use of the plurality of network side converters when at least one of the network side converters is not required to be designated as a first converter, thus improving the efficiency of the power transmission network.

In further embodiments of the invention including a plurality of network side converters, at least two network side converters may be each designated as a first converter. When at least two network side converters are each designated as a first converter, the control system may be configured to operate each first converter in the DC voltage control mode in accordance with a voltage-current or voltage-power droop characteristic and/or to coordinate the operation of the first converters in the DC voltage control mode. Such operation of each first converter improves the stability of the operation of the power transmission network.

In addition to being configured to transmit power from at least one DC transmission link to at least one AC electrical network, the power transmission network according to embodiments of the invention may be configured to transmit power from at least one AC electrical network to at least one DC transmission link. In still further embodiments of the invention including a plurality of network side converters, the control system may be configured to simultaneously operate: a subset of the plurality of network side converters to transfer power from the or each respective DC transmission link to the or each respective AC electrical network; and a subset of the plurality of network side converters to transfer power from the or each respective AC electrical network to the or each respective DC transmission link.

In use, the control system may be rendered incapable of controlling the or each respective network side converter as a result of, for example, a loss of communication between the control system and the or each respective network side converter or a breakdown in the control system.

At least one network side converter may be configured to generate a fixed DC voltage at its DC connecting point in response to the control system being rendered incapable of controlling the or each respective network side converter. At least one network side converter may be configured to receive at least one electrical measurement of the power transmission network and operate in a DC voltage control mode as a DC slack bus to vary a DC voltage at its DC connecting point and thereby facilitate variation of a power transfer between its AC and DC connecting points to accommodate the variation in power generated by the or each respective variable power source, in response to the control system being rendered incapable of controlling the or the respective network side converter.

Configuring at least one network side converter in this manner ensures safe operation of the power transmission network according to embodiments of the invention in the event of the control system being rendered incapable of controlling the or each respective network side converter.

BRIEF DESCRIPTION OF THE DRAWINGS

Embodiments of the invention will now be described, by way of non-limiting examples, with reference to the accompanying drawings in which.

Figure 1:
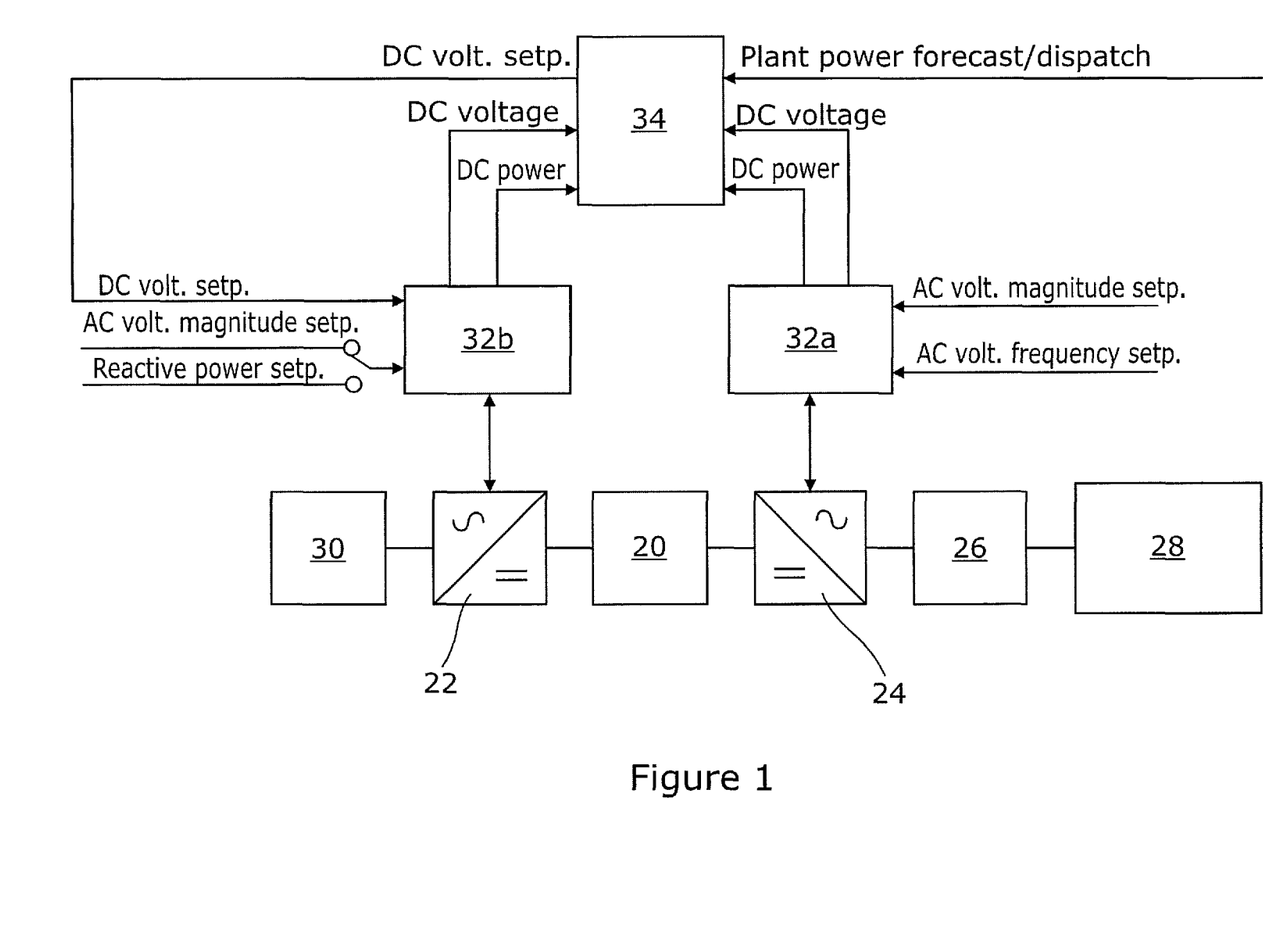
FIG. 1 shows, in schematic form, a power transmission network according to an embodiment of the invention.

A first power transmission network according to an embodiment of the invention is shown in FIG. 1.

DETAILED DESCRIPTION OF THE INVENTION

The first power transmission network comprises: a DC transmission link 20 for DC power transmission between a network side converter 22 and a source side converter 24; an AC transmission link 26 for AC power transmission from a wind farm 28 to a source side converter 24; a source side converter 24 including: a DC connecting point connected to a first end of the DC transmission link 20; and an AC connecting point operably connected to the AC transmission link 26; a network side converter 22 including: an AC connecting point for connection to an AC power grid 30; and a DC connecting point connected to a second end to the DC transmission link 20.

In this manner the first power transmission network is configured as a point-to-point power transmission network for interconnecting the wind farm 28 and the AC power grid 30.

Figure 2:
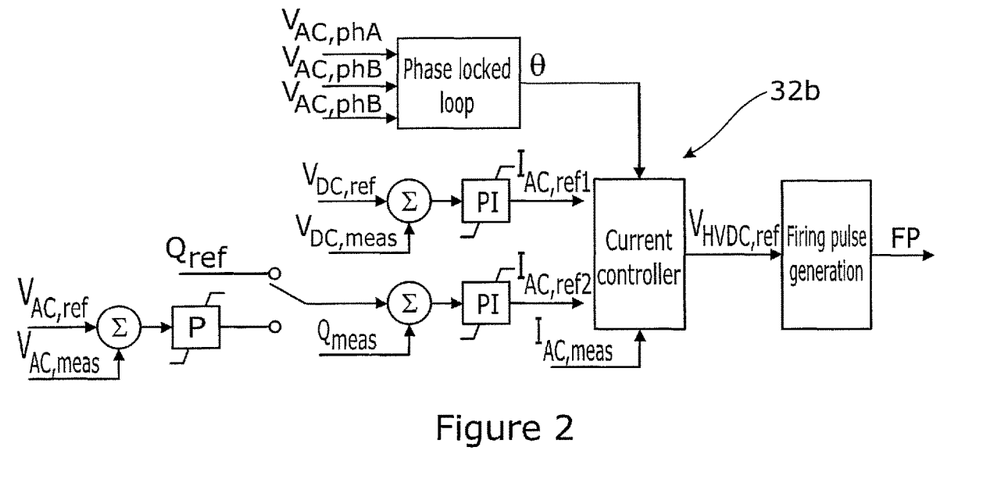
FIGS. 2 and 3 respectively show, in schematic form, the configuration of local controllers of the power transmission network of FIG. 1.
Figure 3:
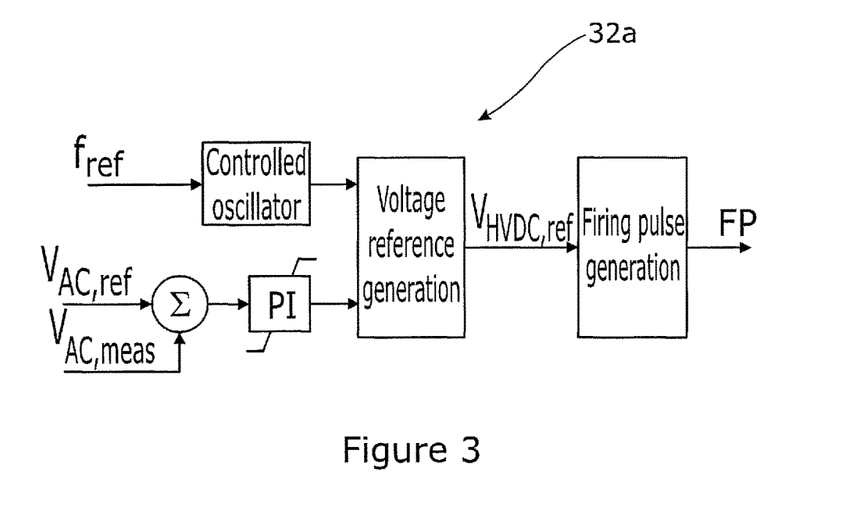

The first power transmission network further includes a control system. The control system includes two local controllers 32a, 32b for controlling the source and network side converters 24, 22 respectively, and a global controller 34 for controlling both of the source and network side converters 24, 22. The global controller 34 may be located remotely from the source and network side converters 24, 22, and is configured to communicate with the local controllers 32a, 32b via telecommunications links. Each local controller 32a, 32b is located in the vicinity of the corresponding converter 24, 22. FIGS. 2 and 3 respectively show, in schematic form, the configurations of the local controllers 32b, 32a for controlling the network and source side converters 22, 24 respectively.

In use, the wind farm 28 generates a power into the AC transmission link 26. The AC transmission link 26 transmits the generated power to the AC connecting point of the source side converter 24. The source side converter 24 transfers the power from its AC connecting point to its DC connecting point, thus transferring power into the DC transmission link 20. The DC transmission link 20 transmits the generated power to the DC connecting point of the network side converter 22. The network side converter 22 transfers the power from its DC connecting point to its AC connecting point, thus transferring power into the AC power grid 30.

During operation of the first power transmission network, a variation in power generated by the wind farm 28 may arise due to its intermittent nature.

For economic reasons, instead of controlling the amount of power generated by the wind farm 28, the first power transmission network is configured to accommodate the variation in power generated by the wind farm 28, thereby transmitting all of the power generated by the wind farm 28 to the AC power grid 30.

More particularly, the source side converter 24 is designated as a second converter, and the control system is configured to operate the second converter in an AC voltage control mode as an AC slack bus to control a magnitude and frequency of an AC voltage of the AC transmission link 26 at a steady-state value and thereby facilitate variation of a power transfer between its AC and DC connecting points to accommodate the variation in power generated by the wind farm 28. Operation of the second converter in the AC voltage control mode facilitates generation of a stable AC voltage waveform in the AC transmission link 26 and thereby allows the wind farm 28 to synchronize to the stable AC voltage waveform. Such synchronization ensures that any power generated by the wind farm 28 will be accommodated by the source side converter 24 and thereby injected into the first power transmission network for transmission to the AC power grid 30.

The operation of the second converter in an AC voltage control mode as an AC slack bus to control a frequency of an AC voltage of the AC transmission link 26 at a steady-state value is carried out using an open loop control, as shown in FIG. 3, but may also be carried out using a feedback control.

Operation of the second converter in the AC voltage control mode however means that the DC voltage at the DC connecting point of the second converter is uncontrolled. This is because the two degrees of freedom available to the second converter is used to operate the second converter in the AC voltage control mode as an AC slack bus to control a magnitude and frequency of an AC voltage of the AC transmission link 26 at a steady-state value.

The network side converter 22 is designated as a first converter. The control system is configured to operate the first converter in the DC voltage control mode as a DC slack bus to vary a DC voltage at its DC connecting point as a DC slack bus to vary a DC voltage at its DC connecting point with respect to the power generated by the wind farm 28.

The transmission of power from the wind farm 28 to the AC power grid 30 requires a voltage slope across the DC transmission link 20 to cause transfer of power from the source side converter 24 to the network side converter 22. In other words, to transmit power from the wind farm 28 to the AC power grid 30, the DC voltage at the DC connecting point of the source side converter 24 must be higher than the network side converter 22.

Transmission losses during transmission of power via the DC transmission link 20 may be reduced by increasing an average DC voltage of the DC transmission link 20 to be near or at its maximum allowable level, which may be dictated by the voltage rating at the DC connecting point of each of the source and network side converters 24, 22. A reduction in transmission losses is achieved by operating the first converter in the DC voltage control mode to increase the DC voltage at its DC connecting point and thereby increase the average DC voltage of the DC transmission link 20 to be near or at its maximum allowable level when the DC voltage at the DC connecting point of the second converter is uncontrolled.

However, the variability in power generated by the wind farm 28, together with the requirement for a voltage slope across the DC transmission link 20, may result in an increase in DC voltage at the DC connecting point of the source side converter 24 above a safe level (e.g. a voltage rating at the DC connecting point) that results in unsafe operation of the first power transmission network.

Operation of the first converter in the DC voltage control mode as a DC slack bus to vary a DC voltage at its DC connecting point with respect to the power generated by the wind farm 28 not only enables control of the DC voltage at the DC connecting point of each converter 22, 24 to stay below or at a safe level across the range of variation of power generated by the wind farm 28, but also enables the increase of the average DC voltage of the DC transmission link 20 during a decrease in power generated by the wind farm 28 to reduce a DC current flowing in the DC transmission link 20 so as to reduce transmission losses for a given power generated by the wind farm 28, thus optimizing power transmission in the first power transmission network.

Hence, the ability of the first converter to operate in the DC voltage control mode allows optimization of the operation of the first power transmission network, and therefore results in a more efficient, reliable and cost-effective first power transmission network.

The control system is configured to operate the first converter to maintain a DC voltage at the DC connecting point of the source side converter 24 at a DC voltage limit when the first converter is operated in the DC voltage control mode. The DC voltage limit is defined either by a voltage rating of the DC connecting point of the second converter, by a value that is lower than the voltage rating of the DC connecting point of the second converter by a predefined voltage safety margin, or the voltage rating of any other equipment connected to the DC transmission link 20. The value of the voltage safety margin may vary depending on the requirements of the first power transmission network, such as safety and reliability.

Configuring the control system in this manner not only further enhances the reliability of the first power transmission network, but allows an operator to readily ensure the operation of the first converter in the DC voltage control mode complies with specific safety parameters through modification of the predefined voltage safety margin.

Operation of the first converter in the DC voltage control mode with respect to the power generated by the wind farm 28 is carried out by configuring the control system, as shown in FIG. 1, to receive: power or direct current measurements from the source and network side converters 24,22, and to operate the first converter in the DC voltage control mode in accordance with the power or direct current measurements; and a predicted or dispatched power generation value from the wind farm 28 and to operate the first converter in the DC voltage control mode in accordance with the predicted or dispatched power generation value or with a value that varies from the predicted or dispatched power generation value by a predefined power safety margin.

In other embodiments of the invention it is envisaged that the control system may be configured to receive either the power or direct current measurements from the source and network side converters 24, 22 or the predicated or dispatched power generation value from the wind farm 28. In still other embodiments of the invention it is envisaged that, in addition to or in place of the power or direct current measurements from the source and network side converters 24,22, the control system may be configured to receive at least one other power or direct current measurement of the first power transmission network, which may be measured at any point of the first power transmission network, such as a point of connection to the wind farm 28 or an AC connecting point of the source or network side converter 22.

The use of the power safety margin in the operation of the first converter in the DC voltage control mode minimizes any adverse effect of any error in the predicted or dispatched power generation value might have on the DC voltage at the DC connecting point of the first converter.

The control system is configured to operate the first converter to maintain the DC voltage at its DC connecting point to be continuously lower than the DC voltage at the DC connecting point of the source side converter 24 when power is being transmitted from the wind farm 28 to the AC power grid 30. Configuration of the control system in this manner ensures complete evacuation of the power generated by the wind farm 28 into the first power transmission network.

The control system is also configured to operate the first converter to vary an AC voltage magnitude or a reactive power at its AC connecting point when the first converter is operated in the DC voltage control mode.

The availability of an additional degree of freedom to the first converter permits its operation to vary an AC voltage magnitude or a reactive power at its AC connecting point while being operated in the DC voltage control mode, thus adding to the functionality of the first converter and thereby further improving the efficiency of the first power transmission network.

The control system is further configured to receive DC voltage measurements of the source and network side converters 24,22 and to operate the first converter in a DC voltage correction mode to vary a DC voltage at its DC connecting point so that the DC voltage measurements match a predefined DC voltage profile of the power transmission network. This allows the first converter to be operated to vary the DC voltage at its DC connecting point in the event that the DC voltage measurements does not match the predefined DC voltage profile.

In other embodiments of the invention it is envisaged that, in addition to or in place of the DC voltage measurements from the source and network side converters 24, 22, the control system may be configured to receive at least one other DC voltage measurement of the first power transmission network, which may be measured at any DC point of the first power transmission network, such as any point along the DC transmission link 20.

Figure 4:
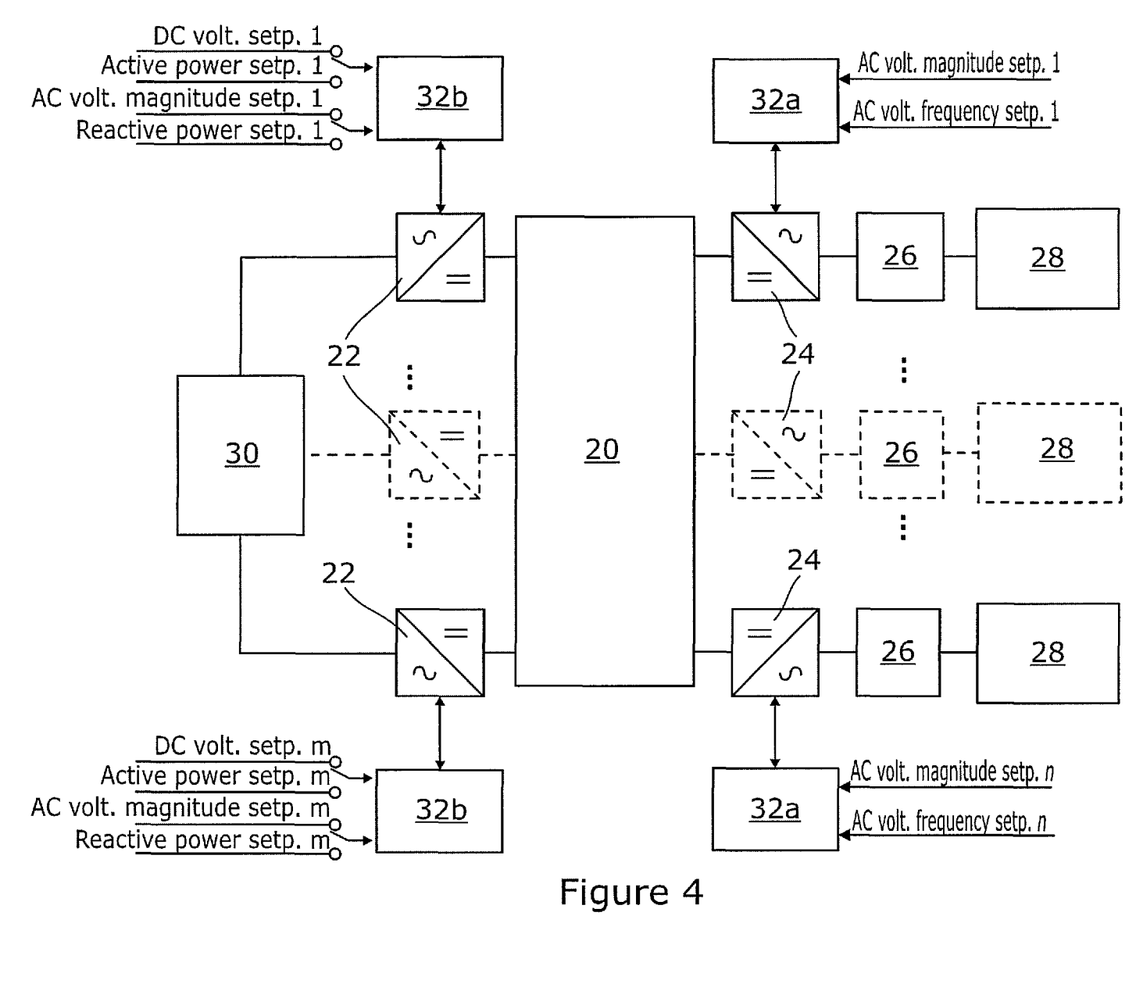
FIG. 4 shows, in schematic form, a power transmission network according to an embodiment of the invention.

A second power transmission network according to an embodiment of the invention is shown in FIG. 4.

The second power transmission network comprises: a DC transmission link 20 for DC power transmission between a plurality of network side converters 22 and a plurality of source side converters 24; a plurality of AC transmission links 26, each AC transmission link 26 being for AC power transmission from a respective one of a plurality of wind farms 28 to a respective one of a plurality of source side converters 24; first and second DC terminals, the DC transmission link 20 being configured to interconnect the first and second DC terminals; a plurality of source side converters 24, each source side converter 24 including: a DC connecting point connected to the first DC terminal; and an AC connecting point connected to a respective one of the AC transmission links 26; a plurality of network side converters 22, each network side converter 22 including: an AC connecting point for connection to an AC power grid 30; and a DC connecting point connected to the second DC terminal.

In this manner the second power transmission network is configured as a multi-terminal power transmission network for interconnecting the plurality of wind farms 28 and the AC power grid 30. It is envisaged that, in other embodiments of the invention, an AC connecting point of each network side converter 22 is for connection to a respective one of a plurality of AC power grids 30.

Figure 5:
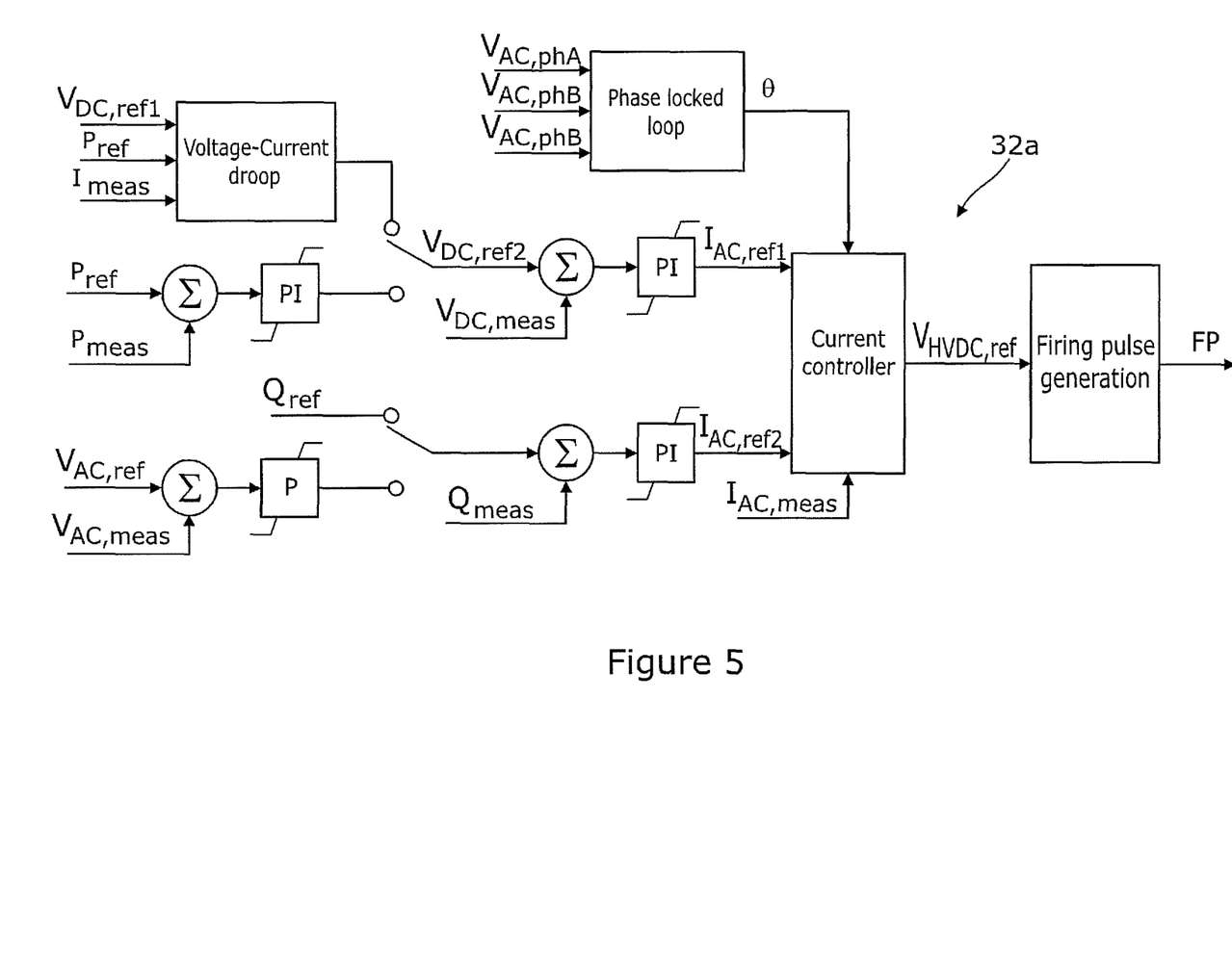
FIG. 5 shows, in schematic form, a configuration of a local controller of the power transmission network of FIG. 4.
Figure 6:
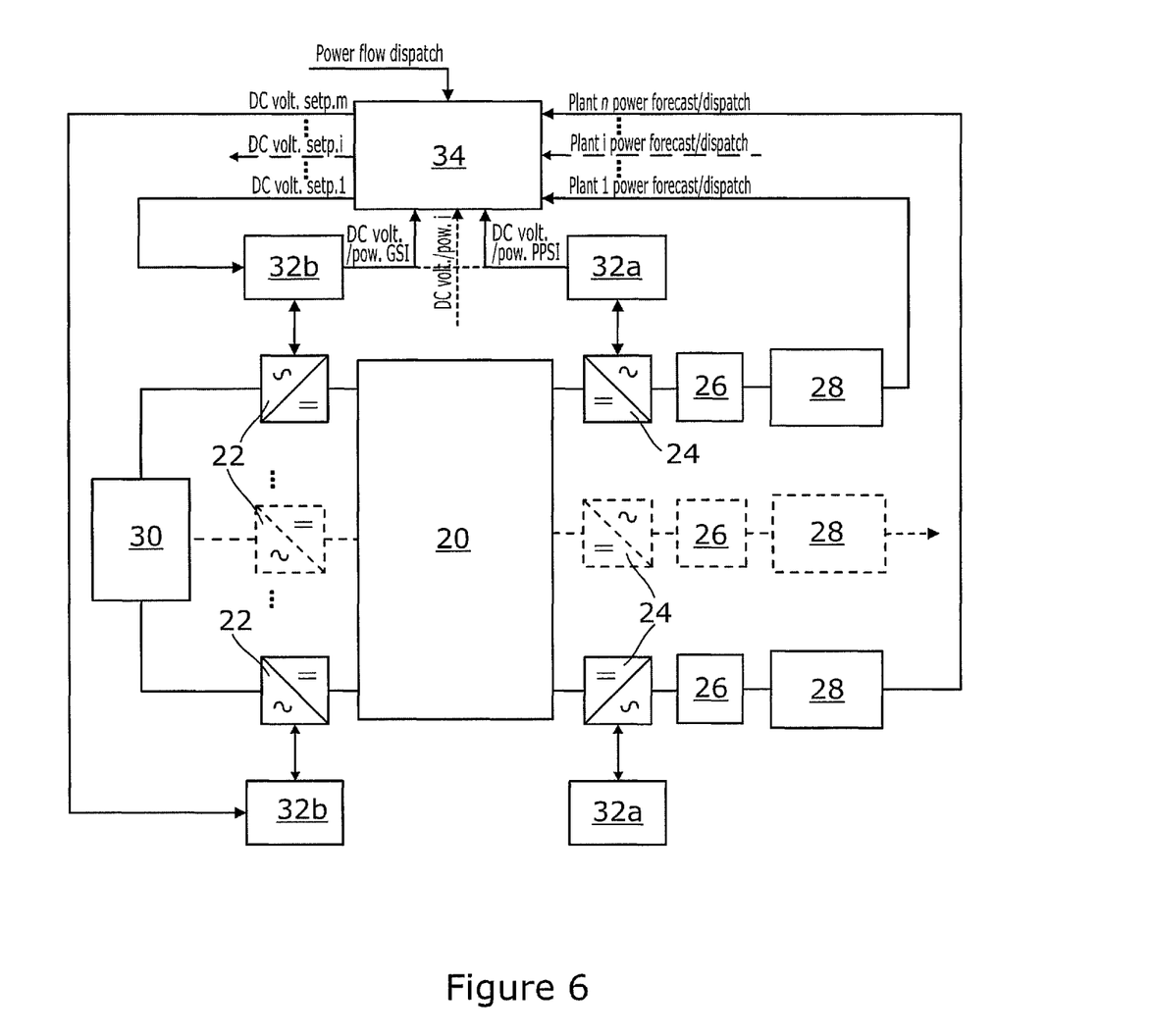
FIG. 6 shows, in schematic form, operation of the power transmission network of FIG. 4.

The second power transmission network further includes a control system. The control system includes a plurality of local controllers 32a, 32b for controlling the source and network side converters 24, 22 respectively, as shown in FIGS. 4 and 5, and a global controller 34 for controlling all of the source and network side converters 24, 22, as shown in FIG. 6. The global controller 34 may be located remotely from the source and network side converters 24, 22, and is configured to communicate with the local controllers 32a, 32b via telecommunications links. Each local controller 32a, 32b is located in the vicinity of the corresponding converter 24, 22. FIG. 5 shows, in schematic form, the configuration of the local controller 32a for each source side converter 24. The configuration of the local controller 32b for each network side converter 22 is identical to the configuration of the local controller 32b shown in FIG. 2.

In use, each wind farm 28 generates a power into the respective AC transmission link 26. Each AC transmission link 26 transmits the generated power to the AC connecting point of the respective source side converter 24. Each source side converter 24 transfers the power from its AC connecting point to its DC connecting point, thus transferring power into the first DC terminal. The DC transmission link 20 transmits the generated power from the first DC terminal to the second DC terminal. In addition the control system is configured to simultaneously operate a subset of the plurality of network side converters 22 to transfer power from the DC transmission link 20 to the AC power grid 30; and a subset of the plurality of network side converters 22 to transfer power from the AC power grid 30 to the DC transmission link 20.

During operation of the second power transmission network, a variation in power generated by one or more of the wind farms 28 may arise due to their intermittent nature.

Each source side converter 24 is designated as a second converter. The control system is configured to operate each second converter in an AC voltage control mode as an AC slack bus in the same manner as the source side converter 24 of the first power transmission network is operated in an AC voltage mode. Operation of each second converter in the AC voltage control mode facilitates generation of a stable AC voltage waveform in each AC transmission link 26 and thereby allows each wind farm 28 to synchronize to the respective stable AC voltage waveform. Such synchronization ensures that any power generated by each wind farm 28 will be accommodated by the respective source side converter 24 and thereby injected into the second power transmission network for transmission to the AC power grid 30.

At least one network side converter 22 is designated as a first converter. The control system is configured to operate the or each first converter in DC voltage control mode in the same manner as the first converter of the first power transmission network is operated in a DC voltage control mode as a DC slack bus to vary a DC voltage at its DC connecting point with respect to the power generated by each wind farm 28, thus resulting in the same benefits as those described above with respect to the first power transmission network.

Other than in the DC voltage control mode, the control system is also configured to operate the or each first converter in the same manner as the first converter of the first power transmission network is operated as described above with respect to the first power transmission network.

At least one other network side converter 22 may be designated as a third converter. The control system is configured to operate the or each third converter in a DC power control mode to control a DC power at its DC connecting point. This permits the operation of the second power transmission network to maximize use of the plurality of network side converters 22 when at least one of the network side converters 22 is not required to be designated as a first converter, thus improving the efficiency of the second power transmission network.

Optionally at least two network side converters 22 may be each designated as a first converter. When at least two network side converters 22 are each designated as a first converter, the control system is configured to operate each first converter in the DC voltage control mode in accordance with a voltage-current or voltage-power droop characteristic and/or to coordinate the operation of the first converters in the DC voltage control mode to achieve a desired power flow profile. Such operation of each first converter improves the stability of the operation of the second power transmission network.

Operation of the or each first converter in the DC voltage control mode is carried out by configuring the control system, as shown in FIG. 6, to receive: power or direct current measurements from the source and network side converters 24,22, and to operate the or each first converter in the DC voltage control mode in accordance with the power or direct current measurements; and predicted or dispatched power generation values from the wind farms 28 and to operate the or each first converter in the DC voltage control mode in accordance with the predicted or dispatched power generation values or with values that vary from the predicted or dispatched power generation values by a predefined power safety margin.

Such operation of the or each first converter in the DC voltage control mode in accordance with the power or direct current measurements from the source and network side converters 24, 22 and the predicted or dispatched power generation values from the wind farms 28 is similar to the above-described corresponding operation of the first converter of the first power transmission network.

In use of each of the first and second power transmission networks, the control system may be rendered incapable of controlling the or each respective network side converter 22 as a result of, for example, a loss of communication between the control system and the or each respective network side converter 22 or a breakdown in the control system.

At least one network side converter 22 may be configured to generate a fixed DC voltage at its DC connecting point in response to the control system being rendered incapable of controlling the or each respective network side converter 22. At least one network side converter 22 may be configured to receive at least one electrical measurement of the power transmission network and operate in a DC voltage control mode as a DC slack bus to vary a DC voltage at its DC connecting point with respect to the power generated by the or each respective wind farm 28, in response to the control system being rendered incapable of controlling the or each respective network side converter 22.

Configuring at least one network side converter 22 in this manner ensures safe operation of each of the first and second power transmission networks in the event of the control system being rendered incapable of controlling the or each respective network side converter 22.

It is envisaged that, in other embodiments of the invention, the or each wind farm may be replaced by another type of variable power source, such as a tidal or solar farm, and/or the AC power grid may be replaced by another type of AC electrical network.

It will be appreciated that the or each network side converter 22 in each of the embodiments shown may be replaced by a DC to DC converter.

The configuration of the control system may vary depending on specific requirements of each of the first and second power transmission networks. In one example, the control system may include only the global controller for controlling the source and network side converters, and the global controller may be configured to communicate with each converter via telecommunications links. In another example, the control system may include only the local controllers for controlling the source and network side converters respectively.

It will be appreciated that the configuration of the global and local controllers were merely chosen to help illustrate the operation of the invention, and that each of the global and local controllers may be replaced by another type of controller with a different configuration. It will also be appreciated that the input values received by the control system shown in FIGS. 1 to 6 were merely chosen to help illustrate the operation of the invention, that not all of the input values are required for the control system to carry out its function, and that other types of input values may be provided to the control system in order for it to carry out its function.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A power transmission network, for interconnecting at least one variable power source and at least one AC or DC electrical network, comprising:
    at least one DC transmission link for DC power transmission between at least one network side converter and at least one source side converter;
    at least one AC transmission link for AC power transmission from the variable power source to at least one source side converter;
    at least one source side converter comprising: a DC connecting point operably connected to the DC transmission link; and an AC connecting point operably connected to the AC transmission link;
    at least one network side converter comprising: an AC or DC connecting point for connection to an AC or DC electrical network; and a DC connecting point operably connected to the DC transmission link; and
    a control system,
    wherein at least one network side converter is designated as a first converter, and the control system is configured to operate the first converter in a DC voltage control mode as a DC slack bus to vary a DC voltage at its DC connecting point with respect to the power generated by the variable power source,
    wherein the control system operates the network side converter to reduce transmission loss by increasing a DC voltage of the DC transmission link to a maximum DC voltage limit when varying the DC voltage at its DC connecting point,
    wherein the maximum DC voltage limit is defined by a voltage rating of the DC transmission link or by a value that is lower than the voltage rating of the DC transmission link by a predefined voltage safety margin.

2. The power transmission network according to claim 1 wherein at least one source side converter is designated as a second converter, and the control system is configured to operate the second converter in an AC voltage control mode as an AC slack bus to control a magnitude and/or frequency of an AC voltage of the AC transmission link at a steady-state value and thereby facilitate variation of a power transfer between its AC and DC connecting points to accommodate a variation in power generated by the variable power source.

3. The power transmission network according to claim 2 wherein the control system is configured to operate the first converter to maintain a DC voltage at the DC connecting point of the source side converter at a DC voltage limit when the first converter is operated in the DC voltage control mode, optionally wherein the DC voltage limit is defined by a voltage rating of the DC connecting point of the second converter or by a value that is lower than the voltage rating of the DC connecting point of the second converter by a predefined voltage safety margin.

4. The power transmission network according to claim 1 wherein the control system is configured to receive:
    at least one power or direct current measurement of the power transmission network and to operate the first converter in the DC voltage control mode in accordance with the power or direct current measurement; and/or
    a predicted or dispatched power generation value from the variable power source and to operate the first converter in the DC voltage control mode in accordance with the predicted or dispatched power generation value or with a value that varies from the predicted or dispatched power generation value by a predefined power safety margin.

5. The power transmission network according to claim 1 wherein the control system is configured to operate the first converter to maintain the DC voltage at its DC connecting point to be continuously lower than the DC voltage at the DC connecting point of the source side converter when power is being transmitted from the variable power source to the AC electrical network.

6. The power transmission network according to claim 1 wherein the control system is configured to receive at least one DC voltage measurement of the power transmission network and to operate the first converter in a DC voltage correction mode to vary a DC voltage at its DC connecting point so that the DC voltage measurement of the power transmission network matches a predefined DC voltage profile of the power transmission network.

7. The power transmission network according to claim 1 wherein the control system includes a global controller for controlling a plurality of converters, at least one local controller for controlling at least one converter, or a combination thereof.

8. The power transmission network according to claim 1, for interconnecting a variable power source and an AC electrical network, further comprising:
  a DC transmission link for DC power transmission between a network side converter and a source side converter;
  an AC transmission link for AC power transmission from the variable power source to a source side converter;
  a source side converter comprising: a DC connecting point operably connected to the DC transmission link; and an AC connecting point operably connected to the AC transmission link; and
  a network side converter comprising: an AC connecting point for connection to the AC electrical network; and a DC connecting point operably connected to the DC transmission link.

9. The power transmission network according to claim 8 wherein the source side converter is designated as a second converter, and the control system is configured to operate the second converter in an AC voltage control mode as an AC slack bus to control a magnitude and frequency of an AC voltage of the AC transmission link at a steady-state value and thereby facilitate variation of a power transfer between its AC and DC connecting points to accommodate a variation in power generated by the variable power source.

10. The power transmission network according to claim 1, for interconnecting at least one variable power source and at least one AC electrical network, further comprising:
  a DC transmission link for DC power transmission between at least one network side converter and at least one source side converter;
  first and second DC terminals, the DC transmission link being configured to operably interconnect the first and second DC terminals;
  at least one AC transmission link for AC power transmission from the variable power source to a or each respective source side converter;
  at least one source side converter comprising: a DC connecting point operably connected to the first DC terminal; and an AC connecting point operably connected to the or each respective AC transmission link; and
  at least one network side converter comprising: an AC connecting point for connection to the or each respective AC electrical network; and a DC connecting point operably connected to the second DC terminal.

11. The power transmission network according to claim 10 wherein the or each source side converter is designated as a second converter, and the control system is configured to operate the or each second converter in an AC voltage control mode as an AC slack bus to control a magnitude and frequency of an AC voltage of the or each respective AC transmission link at a steady-state value and thereby facilitate variation of a power transfer between its AC and DC connecting points to accommodate a variation in power generated by the or each respective variable power source.

12. The power transmission network according to claim 10 further comprising a plurality of network side converters, wherein at least one network side converter not designated as a first converter is designated as a third converter, and the control system is configured to operate the or each third converter in a DC power control mode to control a DC power at its DC connecting point.

13. The power transmission network according to claim 10 further comprising a plurality of network side converters, wherein at least two network side converters are each designated as a first converter, and the control system is configured to operate each first converter in the DC voltage control mode in accordance with a voltage-current or voltage-power droop characteristic.

14. The power transmission network according to claim 10 further comprising a plurality of network side converters, wherein at least two network side converters are each designated as a first converter, and the control system is configured to coordinate the operation of the first converters in the DC voltage control mode.

15. The power transmission network according to claim 10 further comprising a plurality of network side converters, wherein the control system is configured to simultaneously operate:
  a subset of the plurality of network side converters to transfer power from the or each respective DC transmission link to the or each respective AC electrical network; and
  a subset of the plurality of network side converters to transfer power from the or each respective AC electrical network to the or each respective DC transmission link.

16. The power transmission network according to claim 10 wherein at least one network side converter is configured to generate a fixed DC voltage at its DC connecting point in response to the control system being rendered incapable of controlling the or the respective network side converter.

17. The power transmission network according to claim 10 wherein at least one network side converter is configured to receive at least one electrical measurement of the power transmission network and operate in a DC voltage control mode as a DC slack bus to vary a DC voltage at its DC connecting point with respect to the power generated by the or each respective variable power source in response to the control system being rendered incapable of controlling the or each respective network side converter.

* * * * *